United States Patent
Ding et al.

(10) Patent No.: US 10,107,961 B2
(45) Date of Patent: *Oct. 23, 2018

(54) VERTICAL INTEGRATION OF HYBRID WAVEGUIDE WITH CONTROLLED INTERLAYER THICKNESS

(71) Applicant: INPHI CORPORATION, Santa Clara, CA (US)

(72) Inventors: Liang Ding, Singapore (SG); Radhakrishnan L. Nagarajan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,655

(22) Filed: Dec. 27, 2017

(65) Prior Publication Data

US 2018/0136395 A1     May 17, 2018

Related U.S. Application Data

(63) Continuation of application No. 15/586,179, filed on May 3, 2017, now Pat. No. 9,885,831, which is a (Continued)

(51) Int. Cl.
    *H01L 21/76*     (2006.01)
    *G02B 6/132*     (2006.01)
    (Continued)

(52) U.S. Cl.
    CPC ............ *G02B 6/132* (2013.01); *G02B 6/122* (2013.01); *G02B 6/125* (2013.01); *G02B 6/136* (2013.01); *G02B 2006/12061* (2013.01)

(58) Field of Classification Search
    CPC ........ G02B 6/122; G02B 6/132; G02B 6/136; G02B 2006/12061; G02B 2006/12097;
(Continued)

(56) References Cited

U.S. PATENT DOCUMENTS 9,885,831 B2 *   2/2018   Ding ..................... G02B 6/132

* cited by examiner

*Primary Examiner* — Ellen Kim
(74) *Attorney, Agent, or Firm* — Richard T. Ogawa; Ogawa P.C.

(57) ABSTRACT

An silicon photonics device of hybrid waveguides having a coupling interlayer with an accurately controlled thickness and a method of making the same. The device includes a first plurality of Si waveguides formed in a SOI substrate and a first layer of $SiO_2$ overlying the first plurality of Si waveguides and a second plurality of $Si_3N_4$ waveguides formed on the first layer of $SiO_2$. At least one $Si_3N_4$ waveguide is disposed partially overlapping with at least one of the first plurality Si waveguides in vertical direction separated by the first layer of $SiO_2$ with a thickness controlled no greater than 90 nm. The device includes a second layer of $SiO_2$ overlying the second plurality of $Si_3N_4$ waveguides. The method of accurately controlling the coupling interlayer $SiO_2$ thickness includes a multilayer $SiO_2/Si_3N_4/SiO_2$ hard mask process for $SiO_2$ etching and polishing as stopping and buffering layer as well as Si waveguide etching mask.

16 Claims, 5 Drawing Sheets

Related U.S. Application Data continuation of application No. 15/061,946, filed on Mar. 4, 2016, now Pat. No. 9,671,557.

(51) Int. Cl.
*G02B 6/125* (2006.01)
*G02B 6/136* (2006.01)
*G02B 6/122* (2006.01)
*G02B 6/12* (2006.01)

(58) Field of Classification Search
CPC .... G02B 2006/121; G02B 2006/12173; G02B 6/0065; H01L 2223/6627; H01L 25/0657; B82Y 20/00; H01S 5/021; H01S 5/0262
See application file for complete search history.

VERTICAL INTEGRATION OF HYBRID WAVEGUIDE WITH CONTROLLED INTERLAYER THICKNESS

CROSS-REFERENCE TO RELATED APPLICATIONS

This application is a continuation of and claims priority to U.S. patent application Ser. No. 15/586,179 filed May 3, 2017, which is a continuation of and claims priority to U.S. patent application Ser. No. 15/061,946, filed on Mar. 4, 2016 and now is issued as a U.S. Pat. No. 9,671,557 on Jun. 6, 2017, commonly assigned and incorporated by reference herein for all purposes.

BACKGROUND OF THE INVENTION

The present disclosure is related to manufacture technique for integrated silicon photonics device, and particularly to a vertically integrated hybrid waveguide with accurate interlayer thickness control and a method of making the same.

As science and technology are developed rapidly, processing speed and capacity of the computer increase correspondingly. The information transmission or reception using the traditional cable is limited to lower bandwidth as compared to what optical fiber provides. In the advent of Information Age, traditional electrical communication has been largely replaced by fiber-optic communication which provides much higher bandwidth and much longer distance transmission. An optical communication system includes both electrical devices and optical devices, devices for converting electrical signal and optical signal back and forth, and devices for processing these signals. With the advances of optical communication technology and applications driven by the market demand on increasing bandwidth and decreasing package footprint, more intensive effort and progress have been seen in the development of electro-photonic integrated circuits on silicon-on-insulator (SOI) substrate for forming those communication devices.

For example, SOI-based silicon photonics device containing Si waveguide can monolithically be integrated with optically active devices such as electro-optic modulators and Ge photo-detectors (PD). Due to high refractive index contrast of Si vs. $SiO_2$, it enables manufacturing of densely integrated electronic-photonic components at low costs and high volumes. Another advantage lies in good thermal conductivity of Si, which makes it suitable to fabricate thermally tunable photonic devices. However, for improving the performance with high tolerance on environmental temperature, susceptible to higher optical power, high optical transparency, lower propagation loss, less dispersion, and less sensitivity to waveguide shape, different material such as $Si_3N_4$ is introduced into Si-based SOI photonics platform to enjoy both advantages to Si and $Si_3N_4$ waveguide. It is desirable to have improved technique to integrate both active and passive optical functionalities in a same photonics chip. The hybrid waveguide which is made on a $Si_3N_4$-on-SOI platform is a good candidate to design and fabricate good performance of both passive and active optical devices.

BRIEF SUMMARY OF THE INVENTION

The present disclosure is related to manufacture technique for integrated silicon photonics device. More particularly, the invention provides a vertically integrated hybrid waveguide with accurate interlayer thickness control and a method of making the same. In certain embodiments, the invention is applied for high speed optical communication, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a method for forming vertically integrated hybrid waveguides with interlayer thickness control. The method includes providing a silicon-on-insulator (SOI) substrate and forming a multi-layer hard mask comprising a silicon nitride layer overlying a first silicon oxide layer overlying the SOI substrate. Additionally, the method includes forming one or more silicon waveguides in the SOI substrate, each silicon waveguide carrying the multi-layer hard mask on top. The method further includes forming a dielectric layer to overlay the one or more silicon waveguides and cover any gaps separating the one or more silicon waveguides. Then, the method includes removing at least partially the dielectric layer to expose the multi-layer hard mask overlying at least one of the one or more silicon waveguides. Furthermore, the method includes removing at least partially the multi-layer hard mask to leave substantially the first silicon oxide layer overlying the at least one of the one or more silicon waveguides. The method also includes forming a second silicon oxide layer overlying the first silicon oxide layer such that total thickness of the first silicon oxide layer and the second silicon oxide layer is controlled to be no greater than 90 nm across entire area of the SOI substrate. Moreover, the method includes forming one or more silicon nitride waveguides. At least one of the one or more silicon nitride waveguides overlays the second silicon oxide layer at least vertically overlapping with the at least one of the one or more silicon waveguides.

In an alternative embodiment, the present invention provides a silicon photonics device with hybrid waveguides. The silicon photonics device includes a silicon-on-insulator (SOI) substrate and a first plurality of silicon planar waveguides formed in the SOI substrate. Additionally, the silicon photonics device includes a first layer of silicon oxide with a thickness being controlled no greater than 90 nm across entire SOI substrate overlying the first plurality of silicon planar waveguides. Furthermore, the silicon photonics device includes a second plurality of silicon nitride planar waveguides formed on the first layer of silicon oxide. At least one of the second plurality of silicon nitride planar waveguides is disposed in vertical direction at least partially overlapping with at least one of the first plurality of silicon planar waveguides. Moreover, the silicon photonics device includes a second layer of silicon oxide overlying all of the second plurality of silicon nitride planar waveguides.

Many benefits are provided with the improvement according to the present invention. In certain embodiments, the present invention provides. The present invention achieves these benefits and others in the context of broadband communication technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
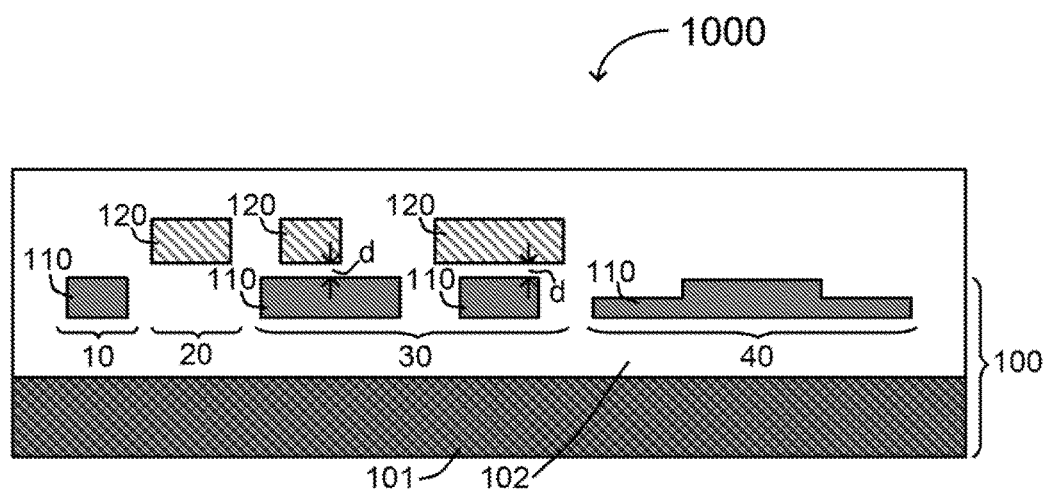
FIG. 1 is a schematic sectional view of vertically integrated hybrid $Si_3N_4$/Si waveguides in a Silicon-on-Insulator (SOI) substrate according to an embodiment of the present invention.

The present disclosure is related to manufacture technique for integrated silicon photonics device. More particularly, the invention provides a vertically integrated hybrid waveguide with accurate interlayer thickness control and a method of making the same. In certain embodiments, the invention is applied for high speed optical communication, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Intensive effort and progress have been seen in the development of photonic integrated circuits in silicon-on-insulator (SOI). Using Si to make photonic devices has many advantages. For example, Si waveguide can monolithically integrate with optically active devices, e.g., electro-optic modulators and Ge photo-detectors (PD). High refractive index contrast between Si and $SiO_2$ enables manufacturability of densely integrated electronic-photonic components at low costs and high volumes. Si also has good thermal conductivity, which makes it suitable to fabricate thermally tunable photonic devices. But for passive optical components, silicon nitride ($Si_3N_4$) waveguides with $SiO_2$ claddings can be superior to Si waveguides in terms of less thermo-optic effects, greatly reduced optical nonlinearities, characteristics of has high transparency into the visible wavelength range, and lower index contrast.

FIG. 1 is a schematic sectional view of vertically integrated hybrid $Si_3N_4$/Si waveguides in a Silicon-on-Insulator (SOI) substrate according to an embodiment of the present invention. This diagram is merely an example, which should not unduly limit the scope of the claims. One of ordinary skill in the art would recognize many variations, alternatives, and modifications. As shown, one or more silicon nitride waveguides 110 are vertically integrated with a silicon oxide interlayer of a thickness d over corresponding one or more selected silicon waveguides 120 formed into a SOI substrate 100 and buried by dielectric cladding material 130. Throughout the specification, a silicon nitride waveguide is referring to the $Si_3N_4$ waveguide and is made essentially by $Si_3N_4$ material. A silicon waveguide is referred to the Si waveguide. The SOI substrate 100 is provided with a Si layer formed on an insulator layer 102 on a Si wafer 101, where the Si layer on top has a predetermined thickness of about 220 nm with 20 nm margin. In some example, the Si layer thickness is less than 300 nm, or is given a thickness suit for forming passive components of a silicon photonics device 1000.

Referring to FIG. 1, the silicon photonics device 1000 includes several types of planar waveguides: Si strip waveguide 10, $Si_3N_4$ waveguide 20, Hybrid $Si_3N_4$/Si waveguide, and Si rib waveguide 40. Waveguide 10, 20, and 30 are in standard planar strip shape of a common thickness equal to the predetermined thickness of the Si layer provided in the SOI substrate 100 but can have various widths depending on layout for specific applications. Waveguide 40 is in a rib shape with additional Si material being removed from at least part of the planar strip shaped waveguide to have one or more extra steps of a height less than the predetermined thickness of the Si layer in the SOI substrate 100. Waveguide 10, 20, and 40 are not hybrid type waveguide but a Si planar waveguide or a $Si_3N_4$ planar waveguide alone. Waveguide 30 is a hybrid one including a $Si_3N_4$ planar strip shaped waveguide 110 located vertically above and at least partially overlapped with a Si planar strip waveguide 120 coupled by a dielectric interlayer with a thickness of d. In an embodiment, the dielectric interlayer of thickness d is part of the insulator material 102, silicon oxide, of the SOI substrate 100. In another embodiment, as illustrated below in more details, each of the one or more Si planar waveguides 120 is formed from the Si layer of the SOI substrate 100. In a specific embodiment, the interlayer thickness d is controlled to be as thin as no greater than 90 nm to ensure a low coupling loss of <0.05 dB per transition. In another specific embodiment, interlayer thickness d is controlled to be at 80 nm with 20 nm error margin. In later sections of the specification, the Si or $Si_3N_4$ planar waveguide is simply referred as silicon (Si) waveguide or silicon nitride ($Si_3N_4$) waveguide.

Referring to FIG. 1 again, in an embodiment, the one or more $Si_3N_4$ waveguides 110 have typical strip shapes with a common thickness of about 400 nm but with various widths, all substantially formed on a same level above the one or more Si waveguides 120 which have carious shapes such as the four types mentioned above. For the hybrid $Si_3N_4$-on-Si type, in an example, the $Si_3N_4$ waveguide 110 has a planar strip shape with a smaller width than that of the Si waveguide 120 in strip shape located below the interlayer of thickness d. In another example, the $Si_3N_4$ waveguide 110 above the interlayer of thickness d has a wider strip shape than that of the Si waveguide 120 below.

In a $Si_3N_4$-on-SOI photonics platform, the interlayer thickness d is critical to ensure low loss coupling between the $Si_3N_4$ waveguide and the Si waveguide. The $Si_3N_4$ layer of the silicon photonics device 1000 is used to make optical passive components, e.g., arrayed waveguide grating (AWG), spot-size convertor (SSC), multimode interferometer (MMI), delay line interferometer (DLI), and etc. Si layer of the silicon photonics device 1000, particularly, the rib shaped Si waveguide, is used to make components for active optical devices, e.g., modulator, thermo-optic switch, Ge detector. In those applications, 80 nm+/−10 nm $SiO_2$ interlayer is a desired target thickness to ensure a low coupling loss of <0.05 dB per transition. However, in a mass production 0.18-μm CMOS foundry process, it is difficult to control the $SiO_2$ interlayer thickness to meet the requirement of 80 nm+/−10 nm. Thus, this become a driving force to develop the following advanced technique for controlling the interlayer thickness to the desired target value for vertically integrated hybrid $Si_3N_4$/Si waveguides based on $Si_3N_4$-on-Si photonics platform.

Figure 2:
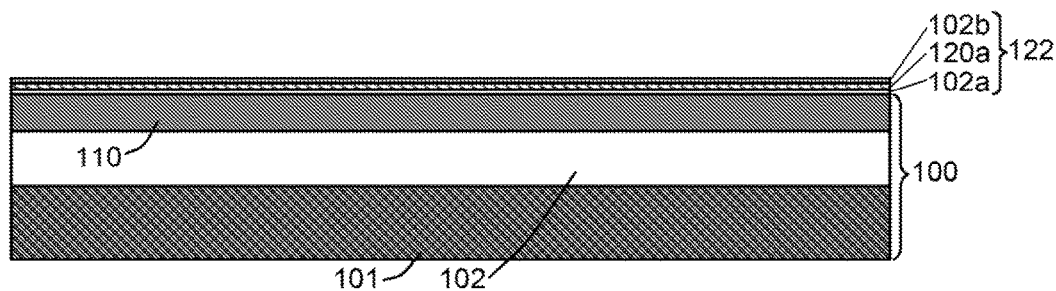
FIG. 2 is a schematic sectional view of a SOI substrate deposited with hard mask layers according to an embodiment of the present invention.

FIG. 2 through FIG. 10 below schematically depicts sequential steps of a method for forming the vertically integrated hybrid $Si_3N_4$/Si waveguides with accurately controlled interlayer thickness. FIG. 2 is a schematic sectional view of a SOI substrate deposited with hard mask layers according to an embodiment of the present invention. This diagram is merely an example, which should not unduly limit the scope of the claims. One of ordinary skill in the art would recognize many variations, alternatives, and modifications. As shown, a SOI substrate 100 is provided with a Si layer 110 on insulator 102 overlying a Si wafer 101. Then, on entire top surface area of the Si layer 110, a multilayer hard mask 122 is formed by sequentially performing several depositions by PECVD. In an implementation, the multilayer hard mask 122 includes a first silicon oxide film 102a overlying entire area of Si layer 110 of the SOI substrate 100 followed by a formation of a silicon nitride film 120a. In another implementation, the multilayer hard mask 122 includes another silicon oxide film 102b overlying the silicon nitride film 120a. All these thin film depositions can be done under the PECVD technique by with accurate thickness control of about <10% variation around a nominal thickness across entire area of the SOI substrate (e.g., entire wafer area). For example, the first silicon oxide film 102a is targeted to a nominal thickness of 30 nm and the silicon nitride film 120a is targeted to a nominal thickness of 40 nm. Another silicon oxide film 102b can be set to 30 nm as its target thickness with 10% variation margin.

Figure 3:
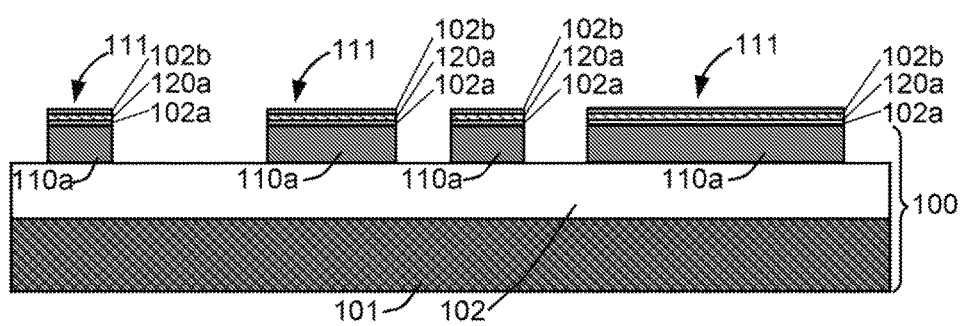
FIG. 3 is a schematic sectional view of silicon waveguides formed on the SOI substrate of FIG. 2 according to an embodiment of the present invention.

FIG. 3 is a schematic sectional view of silicon waveguides formed on the SOI substrate of FIG. 2 according to an embodiment of the present invention. This diagram is merely an example, which should not unduly limit the scope of the claims. One of ordinary skill in the art would recognize many variations, alternatives, and modifications. As shown, multiple Si waveguides 111 are formed in strip shapes by performing Si etching processes based on predetermined pattern defined in the multilayer hard mask 122. Each strip shaped Si waveguide 111 still carries the original portion of the multilayer hard mask 122 on top of the Si layer 110a of substantially the same thickness provided in original SOI substrate 100. Each Si Waveguide 111 has various widths depending on the mask patterns and is separated from each other by a gap of various widths.

Figure 4:
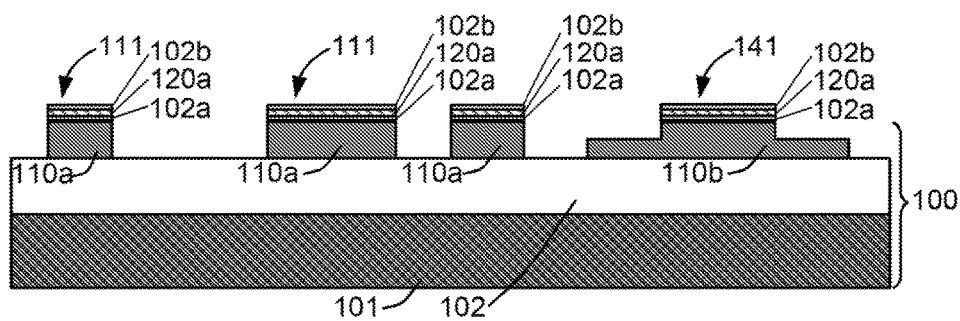
FIG. 4 is a schematic sectional view of additionally processed silicon waveguides of FIG. 3 according to an embodiment of the present invention.

FIG. 4 is a schematic sectional view of additionally processed silicon waveguides of FIG. 3 according to an embodiment of the present invention. This diagram is merely an example, which should not unduly limit the scope of the claims. One of ordinary skill in the art would recognize many variations, alternatives, and modifications. As shown, at least one of the multiple strip shaped Si waveguides 111 is additionally subjected to an etching process which removes addition portion of Si up to a partial thickness of the strip shaped Si waveguide 111 to form at least one middle step in the strip. As a result, a rib Si waveguide 141 is formed including a reduced Si layer 110b made by a portion of Si layer retaining original thickness connected to another portion having a partial thickness. Of course, there can be other alternatives, variations, and modifications to the formation of Si waveguides in SOI substrate.

Figure 5:
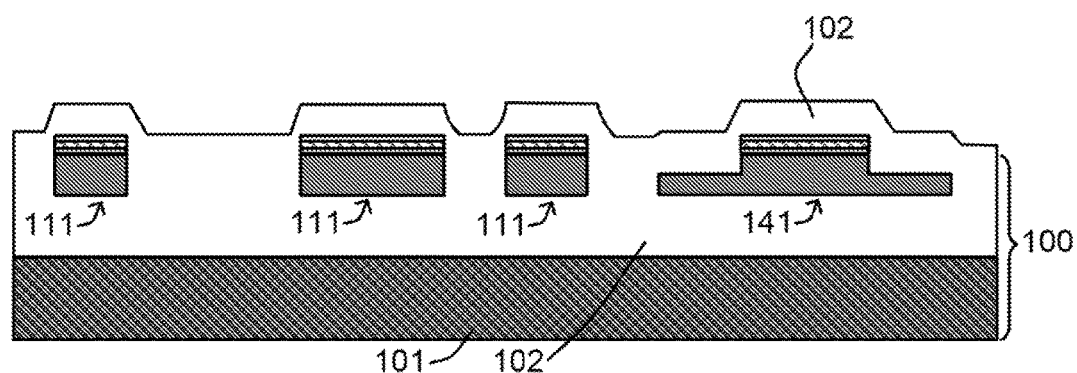
FIG. 5 is a schematic sectional view of a dielectric material overlaid all silicon waveguides of FIG. 4 according to an embodiment of the present invention.

FIG. 5 is a schematic sectional view of a dielectric material overlaid all silicon waveguides of FIG. 4 according to an embodiment of the present invention. This diagram is merely an example, which should not unduly limit the scope of the claims. One of ordinary skill in the art would recognize many variations, alternatives, and modifications. As shown, all Si waveguides formed in previous steps, such as the hard mask covered strip Si waveguides 111 and rib Si waveguide 141, are covered by a dielectric insulator material deposited using PECVD technique. In an implementation, this dielectric insulator material is substantially the same insulator material 102 in the SOI substrate 100. In an implementation, this dielectric insulator material 102 is silicon oxide ($SiO_2$). The coverage of the dielectric material 102 is across entire surface of the hard mask covered multiple Si waveguides 111 or 141 plus any gaps between them. In order to achieve full coverage, the thickness of the dielectric material 102 can be up to nearly twice of the Si layer thickness. For example, the thickness of the dielectric material overlayer 102 above the hard mask covered Si waveguide 111 (or 141) with ~200 nm Si layer is about 400 nm (with 10% error margin). Of course, there can be other alternatives, variations, and modifications.

Figure 6:
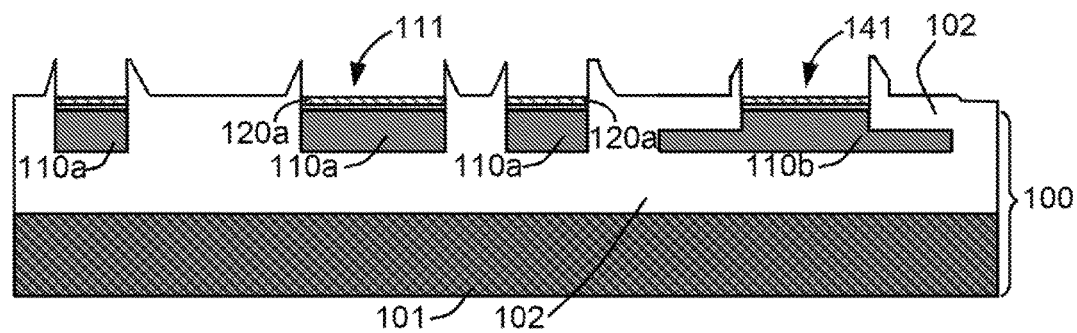
FIG. 6 is a schematic sectional view of the silicon waveguides of FIG. 5 with dielectric material overlayer being partially removed according to an embodiment of the present invention.

FIG. 6 is a schematic sectional view of the silicon waveguides of FIG. 5 with dielectric material overlayer being partially removed according to an embodiment of the present invention. This diagram is merely an example, which should not unduly limit the scope of the claims. One of ordinary skill in the art would recognize many variations, alternatives, and modifications. As shown, a reverser etching process is applied to remove selected portions of the dielectric insulator material 102 based on patterned etch masks. At least two etch masks are involved for performing this reverser etching process. One etch mask is on top of hard mask covered strip Si waveguides 111 and another one is on rib Si waveguide 141. Either etch mask allows the etching of the dielectric material $SiO_2$ until it is substantially stopped by the silicon nitride ($Si_3N_4$) film 120a in the multilayer hard mask 122 (FIG. 2). In an example, for the dielectric material overlayer 102 of 400 nm±40 nm above the Si waveguide 110a, the reverser etching removes the dielectric material of about 330 nm±33 nm. After this step, the remaining film on top of the Si waveguide 110a is a thinned $SiO_2$ film of about 0~66 nm overlying originally placed $Si_3N_4$ film 120a of about 25~44 nm overlying originally placed $SiO_2$ layer 102a of about 30±3 nm during the formation of the multilayer hard mask 122. The silicon nitride film 120a serves as an etch stopper for part of the $SiO_2$ reverser etching process while leaving some non-etched portions of the $SiO_2$ overlayer film.

Figure 7:
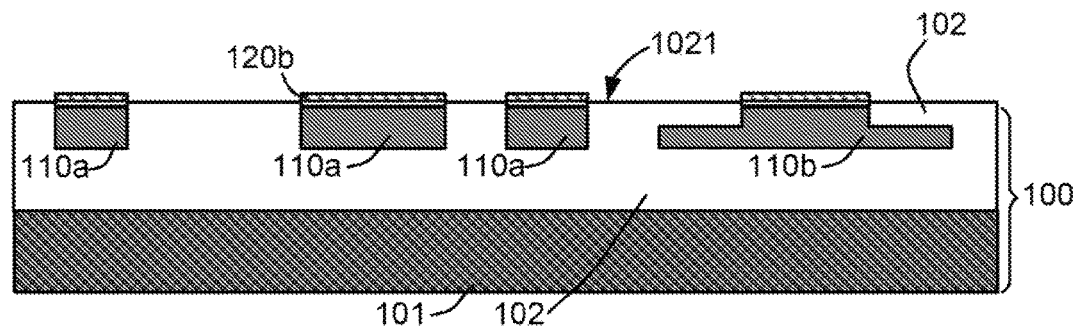
FIG. 7 is a schematic sectional view of the silicon waveguides of FIG. 5 with a first planar overlayer surface according to an embodiment of the present invention.

FIG. 7 is a schematic sectional view of the silicon waveguides of FIG. 5 with a first planar overlayer surface according to an embodiment of the present invention. This diagram is merely an example, which should not unduly limit the scope of the claims. One of ordinary skill in the art would recognize many variations, alternatives, and modifications. As shown, the non-etched portions of $SiO_2$ overlayer film can be wiped out by performing a CMP process. In particular, the CMP process is preferred to be a short-time touch-up polishing process that polishes <40 nm $SiO_2$ film. Normally, $Si_3N_4$ material is polished slower than $SiO_2$ material, e.g., half of $SiO_2$ polishing rate. Therefore, those non-etched portions of $SiO_2$ overlayer 102 can be quickly removed including some $Si_3N_4$ material to make the original silicon nitride film 120a to a thinner silicon nitride film 120b overlying original first silicon oxide film 102a. After this CMP step, a planar overlayer surface 1021 is formed to be substantially leveled with the silicon nitride film 120b. For example, the silicon nitride film 120b has a reduced thickness of 5~27 nm overlying the first silicon oxide film 102a of about 30±3 nm.

Figure 8:
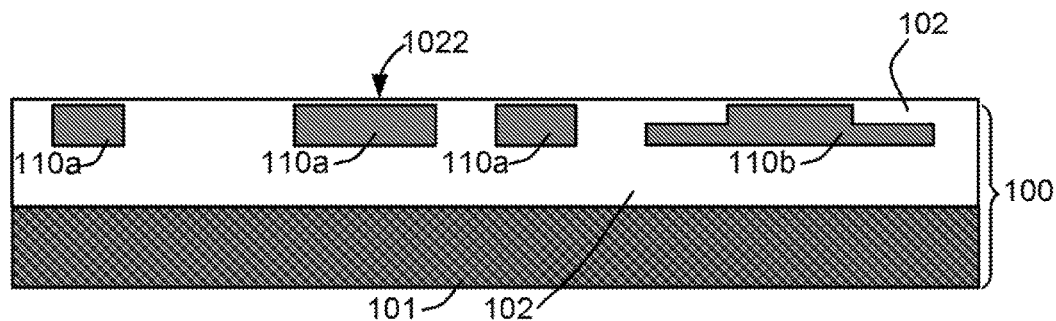
FIG. 8 is a schematic sectional view of the silicon waveguides of FIG. 5 with a second planar overlayer surface according to an embodiment of the present invention.

FIG. 8 is a schematic sectional view of the silicon waveguides of FIG. 5 with a second planar overlayer surface according to an embodiment of the present invention. This diagram is merely an example, which should not unduly limit the scope of the claims. One of ordinary skill in the art would recognize many variations, alternatives, and modifications. As shown, the silicon nitride film 120b with reduced thickness is removed to form a planar surface 1022 to leave the first silicon oxide film 102a as last film on strip Si waveguide 110a as well as on rib Si waveguide 110b. In a specific embodiment, the silicon nitride film is removed using phosphoric acid ($H_3PO_4$) hot bath which specifically removes $Si_3N_4$ material but not the $SiO_2$ material. In an example, the remaining $SiO_2$ film over the strip Si waveguide 110a is substantially the first silicon oxide film 102a originally deposited by PECVD for forming the multilayer hard mask 122 on the Si layer 110 of the SOI substrate 100. Thus, this remaining $SiO_2$ film has accurately controlled thickness, for example, about 30±3 nm determined by previous PECVD process.

Figure 9:
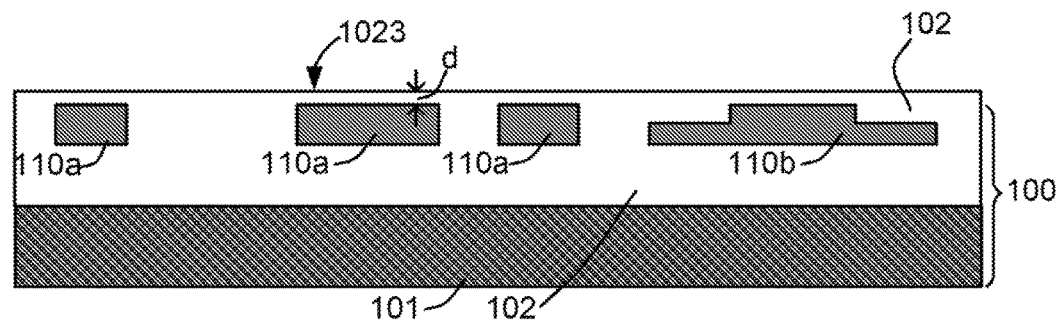
FIG. 9 is a schematic sectional view of the silicon waveguides of FIG. 5 with a third planar overlayer surface according to an embodiment of the present invention.

FIG. 9 is a schematic sectional view of the silicon waveguides of FIG. 5 with a third planar overlayer surface according to an embodiment of the present invention. This diagram is merely an example, which should not unduly limit the scope of the claims. One of ordinary skill in the art would recognize many variations, alternatives, and modifications. As shown, additional silicon oxide material is deposited to increase thickness of $SiO_2$ overlayer film up to a target thickness d. As a result, a new planar surface 1023 of the $SiO_2$ overlayer film is formed. Again PECVD is a preferred technique for depositing the silicon oxide material since by PECVD the deposited $SiO_2$ film thickness can be well controlled within 10% error across entire area of the SOI substrate. In a specific embodiment, about 50 nm of $SiO_2$ film is added on top of the original first $SiO_2$ film of about 30±3 nm to form a final $SiO_2$ overlayer film having the target thickness d~80 nm with 10% error margin over entire surface area of the SOI substrate. In an implementation, this final $SiO_2$ overlayer film is utilized as a coupling interlayer between a strip Si waveguide 110a beneath and another waveguide formed above.

Figure 10:
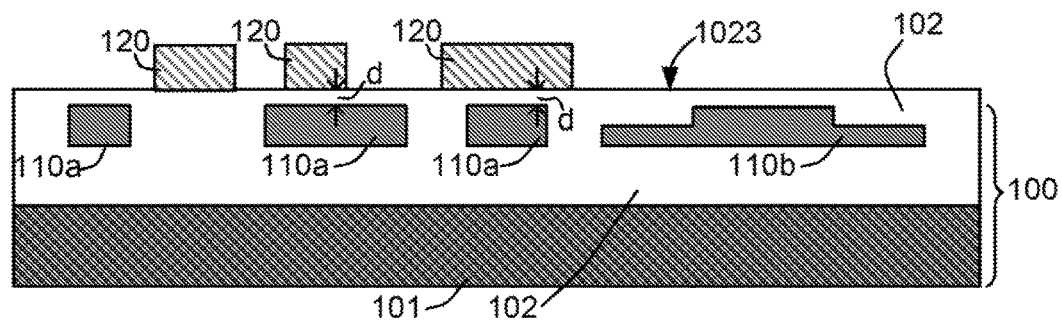
FIG. 10 is a schematic sectional view of silicon nitride waveguides formed on a third planar overlayer surface at least partially vertically overlapped with selected ones of silicon waveguides of FIG. 9 according to an embodiment of the present invention.

FIG. 10 is a schematic sectional view of silicon nitride waveguides formed on a third planar overlayer surface at least partially vertically overlapped with selected ones of silicon waveguides of FIG. 9 according to an embodiment of the present invention. This diagram is merely an example, which should not unduly limit the scope of the claims. One of ordinary skill in the art would recognize many variations, alternatives, and modifications. As shown, multiple silicon nitride waveguides 120 are formed on the planar overlayer surface 1023 at various locations. In an embodiment, a silicon nitride waveguide 120 is formed at a location that is not vertically overlapped with any silicon waveguide 110a or 110b beneath the final $SiO_2$ overlayer film (which becomes natural extension of original insulator material of the SOI substrate). In another embodiment, one or more silicon nitride waveguide 120 are formed at locations that are at least partially overlapped with respective one or more silicon waveguide 110a in strip shape separated from each other vertically by the final $SiO_2$ overlayer film being as a coupling interlayer having a thickness of d~80 nm±10 nm at least across entire overlapping area between the silicon nitride waveguide above and the silicon waveguide below. The combination of these one or more silicon nitride waveguides 120 and the strip silicon waveguides 110a separated by the coupling interlayer of thickness d just form one or more vertically integrated hybrid $Si_3N_4$/Si waveguides.

Referring to FIG. 10, the silicon nitride waveguides 120 in these hybrid $Si_3N_4$/Si waveguides are in typical strip shapes while their widths can be varied to be either smaller or larger than corresponding widths of strip silicon waveguides beneath the coupling interlayer of thickness of d. In the embodiment, the interlayer thickness of d is well controlled within a target value of about 80 nm with just 10% error margin by the series of processes presented earlier from FIG. 2 through FIG. 9. After the formation of these vertically integrated hybrid waveguides, additional dielectric insulator material, preferably the silicon oxide material 102 in the example, is deposited to cover entire surfaces of the multiple silicon nitride waveguides 120 plus any bare insulator surface area. As a result, the silicon photonics device 1000 depicted in FIG. 1 can be formed and used for integration with other passive/active electro-photonic circuits or devices for various optical communication applications.

Figure 11:
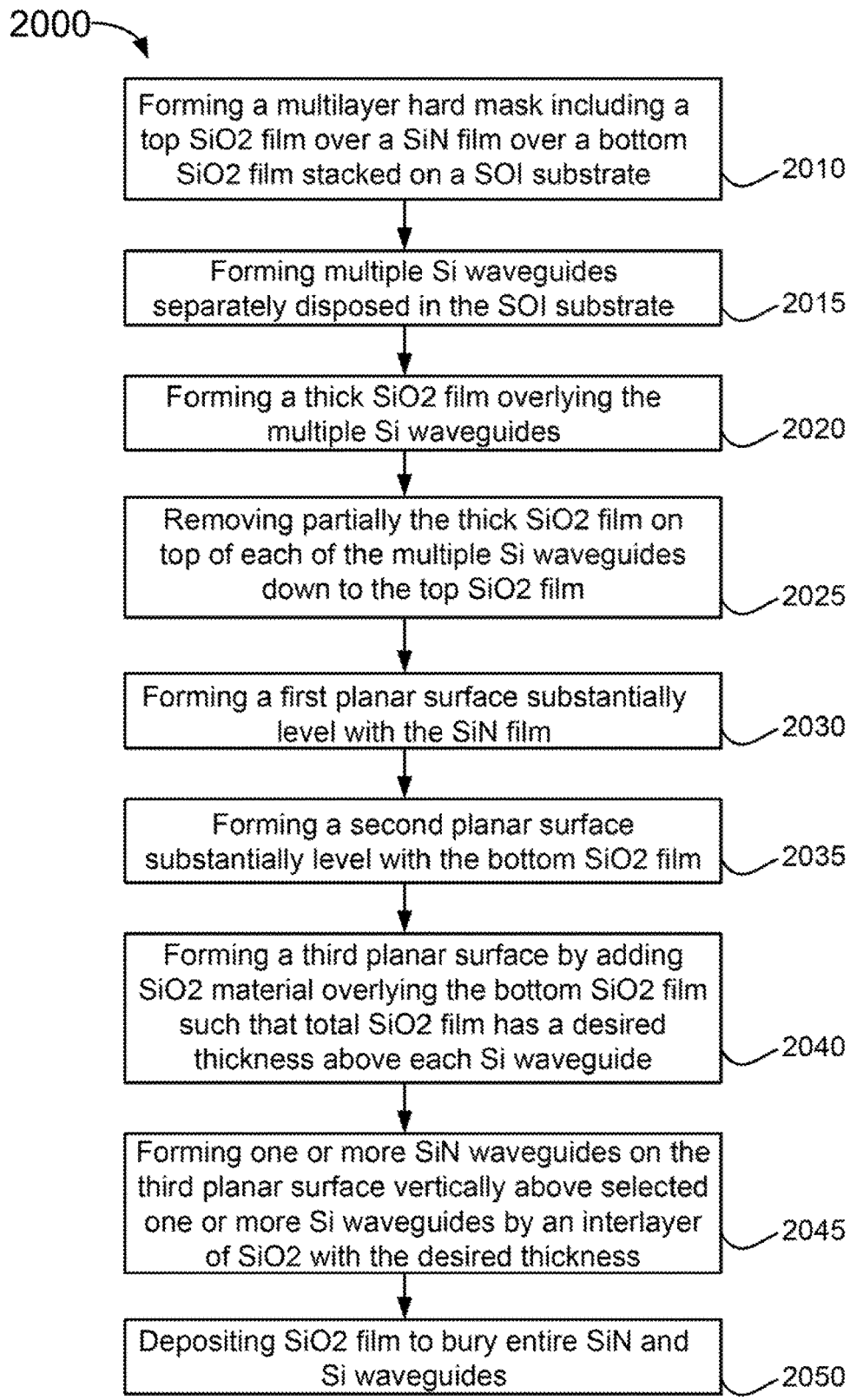
FIG. 11 is a flow chart illustrating a method for forming an insulator interlayer with controlled thickness for coupling vertically a $Si_3N_4$ waveguide over a Si waveguide according to an embodiment of the present invention.

In an alternative embodiment, the present invention provides a method for controlling thickness of an interlayer coupled between a silicon nitride waveguide and a silicon waveguide in $Si_3N_4$-on-Si platform. FIG. 11 is a flow chart illustrating a method for forming an insulator interlayer with controlled thickness for coupling vertically a $Si_3N_4$ waveguide over a Si waveguide according to an embodiment of the present invention. This diagram is merely an example, which should not unduly limit the scope of the claims. One of ordinary skill in the art would recognize many variations, alternatives, and modifications in one or more processes of the method. For example, one or more processes may be skipped or combined with another process. One or more processes may be replaced by another process or switched in order. Additional processes may be inserted in the sequential steps as shown. In a specific embodiment, the process flow includes steps that are substantially illustrated in FIG. 2 through FIG. 10 in above sections of the specification.

Referring to FIG. 11, the method 2000 for forming an insulator interlayer with controlled thickness for coupling vertically a $Si_3N_4$ waveguide over a Si waveguide is substantially compatible with standard CMOS technology based on a SOI substrate. A step 2010 is for forming a multilayer hard mask including a first $SiO_2$ film over a $Si_3N_4$ film over a second $SiO_2$ film stacked on the SOI substrate. These films are formed by deposition with respective film thickness being well controlled within 10% error. For example, state-of-art PECVD technique has been developed to have corresponding deposition rate control to achieve the desired film thickness control. In an example, a 300 Å-$SiO_2$/ 400 Å-$Si_3N_4$/300 Å-$SiO_2$ multilayer hard mask is formed.

Referring to FIG. 11 again, the method 2000 includes a step 2015 for forming multiple Si waveguides separately disposed in the SOI substrate. This step can be done by conventional techniques like lithography, patterning, etching, etc. The Si waveguides as formed can be in typical strip shapes having various widths but substantially a same thickness as defined by original Si layer over an insulator layer provided in the SOI substrate. For example, the Si layer of the SOI substrate is about 2000 Å to 3000 Å. The insulator layer of the SOI substrate is made typically by silicon oxide, $SiO_2$, with a thickness of 2~3 μm. Additional process can be performed to further modify the shape of the Si waveguides. For example, extra Si etching can be performed on part of a strip Si waveguide to reduce its thickness to partial thickness of original Si layer. The strip shape Si waveguide may be transformed to a rib shape or other shapes, although all Si waveguides are substantially still in a same height level relative to the SOI substrate.

The method 2000 additionally include a step 2020 for forming a thick $SiO_2$ film overlying the Si waveguides formed in earlier steps, to essentially embed all the Si waveguides within the same insulator material as that in the SOI substrate. For example, 4000 Å thick $SiO_2$ film deposition is performed by PECVD. In a specific embodiment, the deposition thickness of $SiO_2$ film is 4000 Å±400 Å, with an assumption of ±10% of total thickness variation which is readily achievable for PECVD deposition.

Further, the method 2000 includes a step 2025 for removing partially the thick $SiO_2$ film on top of each of the multiple Si waveguides down to a level below the top $SiO_2$ film of the multilayer hard mask. In an embodiment, this step is a reverser etching process for selectively removing $SiO_2$ material with the $Si_3N_4$ film of the multilayer hard mask being served as an etch stopper on top of each of the multiple Si waveguides. $SiO_2$ dry etching recipe with selectivity ratio of 5-10 relative to $Si_3N_4$ can be developed. Two types of etch masks are involved in this etching process. One is for Si strip waveguide reverse and another is for Si rib waveguide reverse. Once the $SiO_2$ film above the $Si_3N_4$ film is substantially etched, the etching process is stopped. Of course, this etch process may leave a plurality of non-etched portions of $SiO_2$ material with reduced thickness (e.g, less than 400 Å) from the think $SiO_2$ film formed in step 2020.

Furthermore, the method 2000 includes a step 2030 for cleaning up the remaining un-etched portions using chemical-mechanical polishing (CMP) process to form a planar surface. The CMP process is preferred to be a short-time touch-up polishing technique that is designed to remove a pre-set thickness (e.g., <400 Å) of $SiO_2$ layer. Again, the $Si_3N_4$ film of previously formed in the multilayer hard mask serves as a stopping or buffering material to make the planar surface substantially leveled with the hard $Si_3N_4$ film. In this process, a recipe with selectivity ratio of 2-3 times for $SiO_2$ CMP versus $Si_3N_4$ CMP is used, which is readily available in state-of-art CMP equipment. Due to the much slowed CMP rate for $Si_3N_4$ material, after the polishing step, the remaining $Si_3N_4$ film on top of the Si waveguides may still have a thickness of about 50~270 Å (out of the original ~400 Å). Up to this step, the $Si_3N_4$ film is the stopping/buffering material for both $SiO_2$ reverser etching and CMP with a <400 Å $SiO_2$ polishing target, making sure that $Si_3N_4$ film is still, at least partially, left after CMP process and the bottom 300 Å-$SiO_2$ film is not touched. Finally, this ensures the dielectric thickness on top of Si waveguide is controllable.

The method 2000 further includes a step 2035 for forming a second planar surface substantially level with the bottom $SiO_2$ film with the $Si_3N_4$ film being selectively removed. In a specific embodiment, hot $H_3PO_4$ bath process is applied to selectively remove the remaining $Si_3N_4$ film of 50~270 Å, while leaving the bottom 300 Å-$SiO_2$ film on top of the Si waveguides. These $SiO_2$ films over each Si waveguide are substantially leveled with rest of $SiO_2$ material to share a common planar surface across entire SOI substrate, which retain the original uniformity provided by deposition process for forming the bottom 300 Å-$SiO_2$ film of the multilayer hard mask on the SOI substrate.

Moreover, the method 2000 includes a step 2040 for forming a third planar surface by adding $SiO_2$ material overlying the bottom $SiO_2$ film such that total $SiO_2$ film has a desired thickness above each Si waveguide. Adding $SiO_2$ material is done by PECVD, which is much more controllable to give an accurate film thickness for the final $SiO_2$ film over the Si waveguide than using any of those etch or CMP techniques shown in earlier steps. For example, provided that a final $SiO_2$ interlayer thickness of 800 Å is a target thickness, additional 500 Å $SiO_2$ film is deposited with good thickness control over the original 300 Å-$SiO_2$ film.

The method 2000 then includes a step 2045 for forming one or more silicon nitride ($Si_3N_4$) waveguides overlying the third planar surface (of $SiO_2$ film) with at least an interlayer above selected one or more Si waveguides with a thickness being well controlled within a desired value across entire surface area of the third planar surface. Adding $Si_3N_4$ material to form the $Si_3N_4$ waveguide in (for example) strip shape or other shapes can be done by following conventional methods of deposition, patterning, etching under standard CMOS technology, under the condition that the interlayer with the thickness is well controlled to the desired value or smaller for vertically coupling the $Si_3N_4$ waveguide with the Si waveguide underneath has been formed based on the method 2000. Finally, the method 2000 include a step 2050 for depositing $SiO_2$ film to bury entire $Si_3N_4$ waveguides vertically coupled with the Si waveguides via a coupling interlayer in desired thin thickness (of at least 80 nm±10 nm) to ensure a low coupling loss of <0.05 dB per transition of light through these $Si_3N_4$-on-Si hybrid waveguides.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method of using a vertically integrated hybrid waveguides with interlayer thickness control, the method comprising:
   forming the vertically integrated hybrid waveguides in multiple steps performed in a sequential order of:
   (1) providing a substrate;
   (2) forming a multi-layer hard mask overlying the substrate, the multi-layer hard mask comprising a top silicon oxide layer overlying a silicon nitride layer overlying a first silicon oxide layer;
   (3) forming a first waveguide pattern in the substrate, the first waveguide pattern comprising at least one first waveguide made by part of the substrate carrying the multi-layer hard mask on top;
   (4) forming a dielectric layer to overlay the first waveguide pattern and rest of the substrate;
   (5) removing at least partially the dielectric layer to expose the multi-layer hard mask overlying the at least one first waveguide;
   (6) removing at least partially the multi-layer hard mask to leave substantially the first silicon oxide layer overlying the at least one first waveguide;
   (7) forming a second silicon oxide layer overlying the first silicon oxide layer such that total thickness of the first silicon oxide layer and the second silicon oxide layer is controlled to be no greater than 90 nm across the substrate; and
   (8) forming one or more second waveguides overlying the second silicon oxide layer, at least one of the one or more second waveguides vertically overlapping with the at least one first waveguide; and
   using the vertically integrated hybrid waveguides to form one or more photonic devices.

2. The method of claim 1 wherein forming the multi-layer hard mask comprises depositing by PECVD with film thickness control of about 10% margin to sequentially form a top silicon oxide layer of 30 nm overlying the silicon nitride layer of 40 nm or less overlying the first silicon oxide layer of 30 nm or less.

3. The method of claim 1 wherein forming the multi-layer hard mask comprises patterning the multi-layer hard mask to define strip shapes for the first waveguide pattern.

4. The method of claim 3 wherein forming the first waveguide pattern comprises etching through a thickness into the substrate based on the strip shapes defined by the multi-layer hard mask with the top silicon oxide layer as an etching mask.

5. The method of claim 4 wherein forming the first waveguide pattern comprises further etching partially through the thickness of the first waveguide pattern in strip shape to form a silicon rib waveguide with at least one extra step in the strip shape.

6. The method of claim 4 wherein forming a dielectric layer comprises depositing silicon oxide material up to a thickness about twice of the thickness into the substrate.

7. The method of claim 1 wherein removing at least partially the dielectric layer comprises applying a patterned etch mask and performing reverse etching to remove at least a portion of the dielectric layer with the top silicon oxide layer of the multi-layer hard mask as an etch-stopper on top of the at least one first waveguide.

8. The method of claim 7 further comprising removing remaining portions of the dielectric layer by touch-up CMP polishing with the silicon nitride layer of the multi-layer hard mask as a stopper to form a planar surface substantially leveling with the silicon nitride layer of the multi-layer hard mask.

9. The method of claim 1 wherein removing at least partially the multi-layer hard mask comprises using phosphoric acid ($H_3PO_4$) hot bath to remove the silicon nitride layer while keeping substantially the first silicon oxide layer of the multi-layer hard mask.

10. The method of claim 1 wherein forming a second silicon oxide layer comprises using PECVD process to deposit silicon oxide material with thickness control of 10% margin to ensure that the total thickness of silicon oxide material above the at least one first waveguide is about 80 nm±10 nm.

11. The method of claim 1 wherein forming one or more second waveguides comprises forming strip shaped waveguides with a thickness of about 400 nm.

12. The method of claim 1 wherein the one or more second waveguides comprise at least one second waveguide disposed not overlapped with the at least one first waveguides.

13. The method of claim 1 further comprising forming a dielectric material to fully embed the one or more second waveguides partially over the at least one first waveguides in the substrate.

14. The method of claim 1 wherein the substrate is a Silicon-on-Insulator (SOI) substrate.

15. The method of claim 4 wherein the thickness into the substrate comprises substantially a thickness of silicon layer of the SOI substrate.

16. The method of claim 1 wherein each of the one or more second waveguides comprises silicon nitride material.

* * * * *